US009872152B2

(12) United States Patent
Kumabe et al.

(10) Patent No.: US 9,872,152 B2
(45) Date of Patent: Jan. 16, 2018

(54) VEHICLE ONBOARD COMMUNICATION TERMINAL AND MOBILE COMMUNICATION SYSTEM

(71) Applicant: DENSO CORPORATION, Kariya, Aichi-pref. (JP)

(72) Inventors: Seigou Kumabe, Kariya (JP); Noriyuki Tomioka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/303,332

(22) PCT Filed: Mar. 24, 2015

(86) PCT No.: PCT/JP2015/001663
§ 371 (c)(1),
(2) Date: Oct. 11, 2016

(87) PCT Pub. No.: WO2015/162851
PCT Pub. Date: Oct. 29, 2015

(65) Prior Publication Data
US 2017/0034667 A1 Feb. 2, 2017

(30) Foreign Application Priority Data

Apr. 22, 2014 (JP) .................. 2014-088488

(51) Int. Cl.
*H04W 24/00* (2009.01)
*H04W 4/04* (2009.01)
(Continued)

(52) U.S. Cl.
CPC .............. *H04W 4/04* (2013.01); *B60W 40/00* (2013.01); *G06F 21/35* (2013.01); *G07C 5/008* (2013.01);
(Continued)

(58) Field of Classification Search
None
See application file for complete search history.

(56) References Cited

U.S. PATENT DOCUMENTS

2010/0246556 A1* 9/2010 Kaneko ............... H04B 1/0475
370/343

FOREIGN PATENT DOCUMENTS

| JP | 2008-0099085 A | 4/2008 |
| JP | 2008-0294646 A | 12/2008 |
| JP | 2010114819 A | 5/2010 |

* cited by examiner

*Primary Examiner* — Idowu O Osifade
(74) *Attorney, Agent, or Firm* — Harness, Dickey & Pierce, P.L.C.

(57) ABSTRACT

A vehicle onboard communication terminal in a mobile communication system that establishes vehicle-to-vehicle communication and road-to-vehicle communication by using a carrier wave and employs Carrier Sense Multiple Access/Collision Avoidance method includes: a reception processing portion that receives road-to-vehicle communication data transmitted from a roadside device and vehicle-to-vehicle communication data transmitted from a different vehicle onboard communication terminal; a transmission processing portion; a transmission control portion that controls an operation of the transmission processing portion and has a regular transmission mode and a passive transmission mode; and a determination portion. The transmission control portion detects usage of the carrier frequency when the transmission control portion is operating in the regular transmission mode. the transmission control portion stops the transmission of the vehicle-to-vehicle communication data and receives data addressed to the vehicle onboard communication terminal from the roadside device when the transmission control portion is operating in the passive transmission mode.

14 Claims, 5 Drawing Sheets

(51) Int. Cl.
*H04W 74/08* (2009.01)
*H04L 29/08* (2006.01)
*H04W 4/00* (2009.01)
*B60W 40/00* (2006.01)
*G08G 1/01* (2006.01)
*G08G 1/0967* (2006.01)
*G07C 5/00* (2006.01)
*G06F 21/35* (2013.01)

(52) U.S. Cl.
CPC ..... *G08G 1/0112* (2013.01); *G08G 1/096716* (2013.01); *G08G 1/096758* (2013.01); *G08G 1/096791* (2013.01); *H04L 67/12* (2013.01); *H04L 67/18* (2013.01); *H04W 4/005* (2013.01); *H04W 4/046* (2013.01); *H04W 74/08* (2013.01); *H04W 74/085* (2013.01)

VEHICLE ONBOARD COMMUNICATION TERMINAL AND MOBILE COMMUNICATION SYSTEM

CROSS-REFERENCE TO RELATED APPLICATIONS

This application is a U.S. National Phase Application under 35 U.S.C. 371 of International Application No. PCT/JP2015/001663 filed on Mar. 24, 2015 and published in Japanese as WO 2015/162851 A1 on Oct. 29, 2015. This application is based on and claims the benefit of priority from Japanese Patent Application No. 2014-088488 filed on Apr. 22, 2014. The entire disclosures of all of the above applications are incorporated herein by reference.

TECHNICAL FIELD

The present disclosure relates to a vehicle onboard communication terminal that establishes road-to-vehicle communication and vehicle-to-vehicle communication. The present disclosure also relates to a mobile communication system that includes the vehicle onboard communication terminal.

BACKGROUND ART

As disclosed, for example, in Patent Literature 1, a mobile communication system having a vehicle onboard communication terminal has been proposed recently. The vehicle onboard communication terminal is used in a vehicle to wirelessly communicate with another vehicle onboard communication terminal used in another vehicle and a roadside device that is installed on a roadside. Communication between the vehicle onboard communication terminal included in the mobile communication system and the roadside device is referred to as road-to-vehicle communication. Communication between the vehicle onboard communication terminal and another vehicle onboard communication terminal is referred to as vehicle-to-vehicle communication.

Road-to-vehicle communication is used to distribute traffic information generated, for example, by a traffic information center or used to provide billing services for the usage of a toll road or a pay parking lot. Therefore, it is generally necessary to prevent road-to-vehicle communication from being obstructed by vehicle-to-vehicle communication.

Schemes for preventing road-to-vehicle communication from being obstructed by vehicle-to-vehicle communication have been studied. The studied schemes include a configuration for using one carrier frequency for road-to-vehicle communication and using another carrier frequency for vehicle-to-vehicle communication and a configuration for providing a slot for road-to-vehicle communication by using a time-division multiplexing method even when the same carrier frequency is used for road-to-vehicle communication and vehicle-to-vehicle communication.

The inventors of the present application have found the following. According to one of the above-mentioned configurations, the road-to-vehicle communication and the vehicle-to-vehicle communication use different frequencies or slots. Therefore, the road-to-vehicle communication can be established without being affected by the amount of data transmitted by the vehicle-to-vehicle communication.

As the other configuration, the road-to-vehicle communication and the vehicle-to-vehicle communication may use the same carrier frequency, and the roadside device and the vehicle onboard communication terminal may transmit data by the CSMA/CA (Carrier Sense Multiple Access/Collision Avoidance) method. In this instance, too, the roadside device and the vehicle onboard communication terminal both transmit data while observing the use of the carrier frequency (also referred to as a carrier). However, when the number of vehicle onboard communication terminals around the roadside device increases, the time during which the carrier is available decreases. As a result, the roadside device may fail to acquire a data transmission right.

PRIOR ART LITERATURE

Patent Literature

Patent Literature 1: JP 2010-114819 A

SUMMARY OF INVENTION

It is an object of the present disclosure is to provide a mobile communication system and a vehicle onboard communication terminal that are capable of reducing the possibility of road-to-vehicle communication being obstructed by vehicle-to-vehicle communication in a situation where the mobile communication system establishes vehicle-to-vehicle communication and road-to-vehicle communication by using the identical carrier frequency and allows individual communication terminals to transmit data by the CSMA method.

A vehicle onboard communication terminal according to one aspect of the present disclosure is used in a mobile communication system that establishes vehicle-to-vehicle communication and road-to-vehicle communication by using a carrier wave having an identical carrier frequency and employs Carrier Sense Multiple Access/Collision Avoidance method as an access method. The vehicle onboard communication terminal includes: a reception processing portion that receives road-to-vehicle communication data transmitted from a roadside device and vehicle-to-vehicle communication data transmitted from a different vehicle onboard communication terminal; a transmission processing portion that performs a process transmitting the road-to-vehicle communication data and the vehicle-to-vehicle communication data; a transmission control portion that controls an operation of the transmission processing portion and has a regular transmission mode and a passive transmission mode as a mode of controlling the operation of the transmission processing portion; and a determination portion that determines, based on determination data, whether to place the transmission control portion in the passive transmission mode, the determination data determining whether a transmission of the vehicle-to-vehicle communication data from the vehicle onboard communication terminal is likely to obstruct transmission of the road-to-vehicle communication data from the roadside device or from the different vehicle onboard communication terminal. The transmission control portion operates in the passive transmission mode when the determination portion has determined that the transmission control portion is to be placed in the passive transmission mode, and operates in the regular transmission mode when the determination portion has not determined that the transmission control portion is to be placed in the passive transmission mode. The transmission control portion detects usage of the carrier frequency when the transmission control portion is operating in the regular transmission mode, and operates so as to successively transmit the road-to-vehicle communication data and the vehicle-to-vehicle communication data when the carrier frequency is determined to be unused. The transmission control portion stops the transmission of the vehicle-to-vehicle communication data and receives data addressed to the vehicle onboard communication terminal from the roadside device when the transmission control portion is operating in the passive transmission mode, and operates so as to transmit the road-to-vehicle communication data when a response needs to be transmitted in response to a received data.

A mobile communication system that establishes vehicle-to-vehicle communication and road-to-vehicle communication by using a carrier wave having an identical carrier frequency and employs Carrier Sense Multiple Access/Collision Avoidance method as an access method according to another aspect of the present disclosure includes: a plurality of vehicle onboard communication terminals and a roadside device. The roadside device includes: a roadside device transmission processing portion that performs a process of transmitting road-to-vehicle communication data; and a roadside device transmission control portion that detects usage of the carrier frequency and, when the carrier frequency is determined to be unused, operates so as to transmit the road-to-vehicle communication data. Each of the vehicle onboard communication terminals includes: a reception processing portion that receives the road-to-vehicle communication data transmitted from the roadside device and vehicle-to-vehicle communication data transmitted from a different vehicle onboard communication terminal; a transmission processing portion that performs a process transmitting the road-to-vehicle communication data and the vehicle-to-vehicle communication data; a transmission control portion that controls an operation of the transmission processing portion and has a regular transmission mode and a passive transmission mode as a mode of controlling the operation of the transmission processing portion; and a determination portion that determines based on determination data whether to place the transmission control portion in the passive transmission mode, the determination data determining whether a transmission of the vehicle-to-vehicle communication data from the vehicle onboard communication terminal is likely to obstruct the transmission of the road-to-vehicle communication data from the roadside device or from the different vehicle onboard communication terminal. The transmission control portion operates in the passive transmission mode when the determination portion has determined that the transmission control portion is to be placed in the passive transmission mode, and operates in the regular transmission mode when the determination portion has not determined that the transmission control portion is to be placed in the passive transmission mode. The transmission control portion detects the usage of the carrier frequency when the transmission control portion is operating in the regular transmission mode, and operates so as to successively transmit the road-to-vehicle communication data and the vehicle-to-vehicle communication data when the carrier frequency is determined to be unused. The transmission control portion stops the transmission of the vehicle-to-vehicle communication data and receives data addressed to the vehicle onboard communication terminal from the roadside device when the transmission control portion is operating in the passive transmission mode, and operates so as to transmit the road-to-vehicle communication data when a response needs to be transmitted in response to the received data.

The vehicle onboard communication terminal and the mobile communication system according to one aspect of the present disclosure are configured so that the determination portion determines whether the transmission control portion should operate in the passive transmission mode based on the determination data. The determination data is used to determine whether the transmission of vehicle-to-vehicle communication data by the host terminal may obstruct the transmission of road-to-vehicle communication data by the roadside device or another vehicle onboard communication terminal. When the determination portion determines that the transmission control portion should operate in the passive transmission mode, the transmission control portion operates in the passive transmission mode.

When the transmission control portion operates in the passive transmission mode, a vehicle onboard communication terminal stops the transmission of vehicle-to-vehicle communication data and receives data addressed to the vehicle onboard communication terminal from the roadside device. When it is necessary to transmit a response to the received data, the vehicle onboard communication terminal transmits road-to-vehicle communication data.

That is, when the transmission control portion of the vehicle onboard communication terminal is in the passive transmission mode, the vehicle onboard communication terminal does not transmit data when it is not necessary to transmit a response to the data received from the roadside device. This reduces the possibility of the carrier frequency being used to transmit vehicle-to-vehicle communication data. Thus, it reduces the possibility of the carrier frequency being used when the roadside device or the vehicle onboard communication terminal needs to transmit road-to-vehicle communication data.

The vehicle onboard communication terminal and the mobile communication system according to one aspect of the present disclosure reduce the possibility of road-to-vehicle communication being obstructed by vehicle-to-vehicle communication in a mobile communication system that establishes vehicle-to-vehicle communication and road-to-vehicle communication by using the same carrier frequency and employs the CSMA method as an access method.

BRIEF DESCRIPTION OF DRAWINGS

The above and other aspects, features and advantages of the present disclosure will become more apparent from the following detailed description made with reference to the accompanying drawings. In the drawings.

PREFERRED EMBODIMENTS FOR CARRYING OUT INVENTION (Outline of Overall Configuration)

Figure 1:
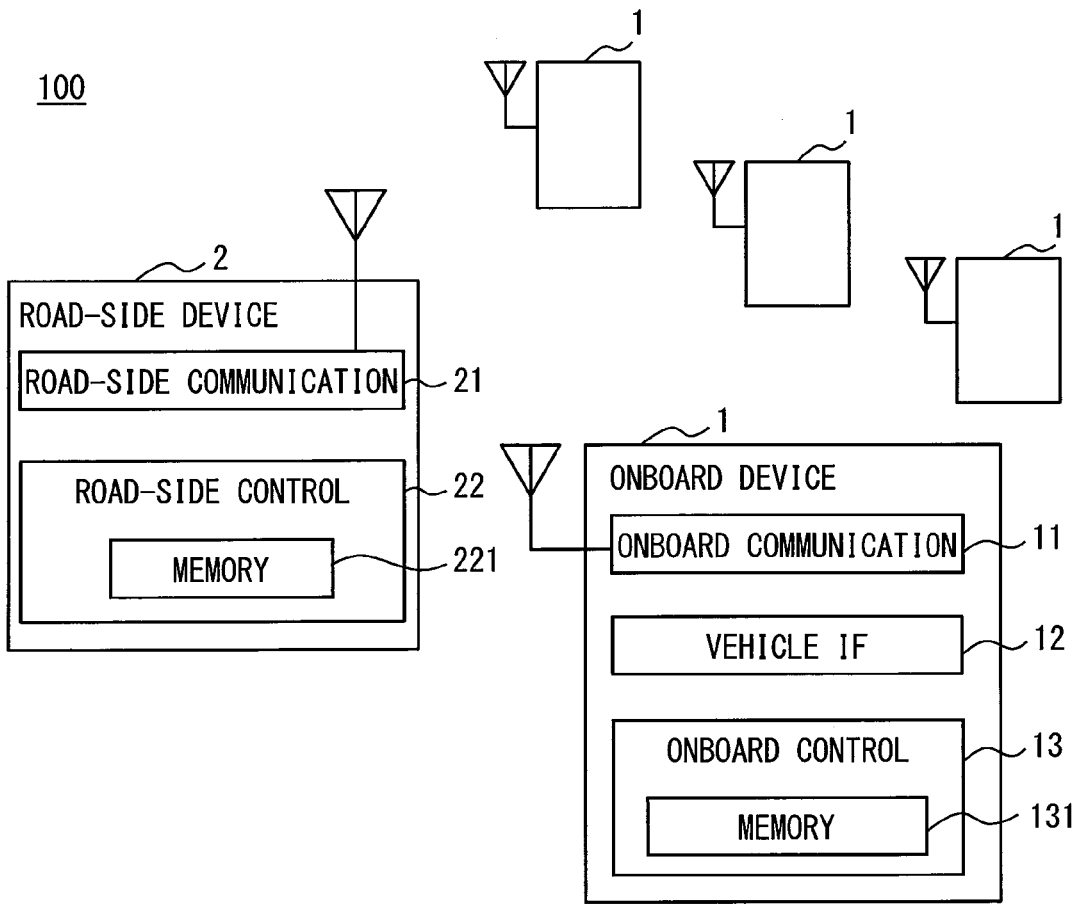
FIG. 1 is a block diagram illustrating an exemplary outline configuration of a mobile communication system according to an embodiment of the present disclosure.

An embodiment of the present disclosure will be described with reference to the drawings. FIG. 1 is a block diagram illustrating an outline configuration of a mobile communication system 100 according to the present embodiment. The mobile communication system 100 includes an onboard device 1 and a roadside device 2. The onboard device 1 is mounted in each of multiple vehicles. For the sake of convenience, FIG. 1 shows only one roadside device 2. However, the mobile communication system 100 may include multiple roadside devices 2. The onboard device 1 corresponds to a vehicle onboard communication terminal according to the present disclosure. When the onboard device 1 and the roadside device 2 are not to be distinguished from each other, they will be simply referred to as communication terminals.

The onboard device 1 and the roadside device 2 establish known road-to-vehicle communication. The onboard device 1 establishes known vehicle-to-vehicle communication with another onboard device 1 (also referred to as a different onboard device). For both vehicle-to-vehicle communication and road-to-vehicle communication, the CSMA/CA (Carrier Sense Multiple Access/Collision Avoidance) method is employed as an access method. Further, the same carrier frequency (hereinafter referred to as a carrier) is employed for vehicle-to-vehicle communication and road-to-vehicle communication. That is, the mobile communication system 100 is configured so that vehicle-to-vehicle communication and road-to-vehicle communication share the same carrier on the basis of the CSMA/CA method.

It is assumed that the present embodiment uses, for example, electric waves in a 700-MHz band to establish vehicle-to-vehicle communication and road-to-vehicle communication. However, an alternative is to use, for example, electric waves in a 5.8-GHz band. Further, it is assumed that the range of signals transmitted from individual communication terminals (that is, the wireless communication area) is designed to be several hundred meters although it varies depending, for instance, on the existence of buildings and other shields and the height of a transmitting source from a road surface.

During vehicle-to-vehicle communication, the onboard device 1 transmits data to all onboard devices 1 existing in the wireless communication area. That is, the onboard device 1 broadcasts data to all the onboard devices 1 in the wireless communication area. During road-to-vehicle communication, however, the roadside device 2 not only broadcasts data, but also transmits data, in the unicast mode, to a specific onboard device 1 existing within a wireless communication range. Upon receipt of data transmitted in the unicast mode from the roadside device 2, the onboard device 1 transmits data addressed to the roadside device 2 in response to the received data. That is, during road-to-vehicle communication, P2P communication, in which a communication partner is specified, is established between the roadside device 2 and an onboard device 1 designated by the roadside device 2.

For each of the communication terminals (namely, the onboard devices 1 and the roadside device 2) included in the mobile communication system 100, an identification code (referred to as the terminal ID) is set in order to identify each of the multiple communication terminals. Further, data transmitted from a communication terminal includes the terminal ID of such a transmitting terminal. Therefore, when a communication terminal receives data, the terminal ID included in the data enables the communication terminal to identify a transmitting terminal.

(Configuration of Roadside Device 2)

The roadside device 2 establishes road-to-vehicle communication with an onboard device 1 existing in the wireless communication area formed by the roadside device 2 in order to distribute various information to the onboard device 1 and acquire various information from the onboard device 1. The roadside device 2 may be installed, for example, at an intersection, in the middle of a road (a so-called link) connecting one intersection to another, at an entrance or exit of a specific institution, or at some other locations suitable for the use of the roadside device 2.

The roadside device 2 is installed, for example, at an intersection or in the middle of a road to distribute driving assistance information, which assists a driver of a vehicle in recognizing and determining traffic conditions around the roadside device 2. Here, the driving assistance information, for example, indicates traffic congestion information around the roadside device 2, represents information about an upcoming intersection, and indicates the existence of, for instance, vehicles, pedestrians, and obstacles in a driver's blind-spot area around the roadside device 2. Here, the area around the roadside device 2 may represent a range that is designed as appropriate on the basis of the location of the roadside device 2.

The roadside device 2 may broadcast the driving assistance information to onboard devices 1 existing around the roadside device 2 or unicast the driving assistance information to a specific onboard device 1. The driving assistance information may be unicasted, for example, to a vehicle that is about to turn right. In this instance, the driving assistance information to be transmitted may include information indicative of whether there is an oncoming vehicle and the traffic conditions (the presence of pedestrians) of a road to travel on after a right turn.

Further, the roadside device 2 may be installed, for example, at an entrance and exit of a toll road to establish road-to-vehicle communication and mainly bill the driver of a vehicle for traveling on the toll road on the basis of the use of the toll road.

When used in the above manner, the roadside device 2 establishes road-to-vehicle communication with an onboard device 1, acquires billing information, that is, the information necessary for calculating the bill for a vehicle that starts using the toll road, from the onboard device 1, and uploads the acquired billing information to a billing server that manages a toll road billing service. The billing information includes, for example, the identification information about the vehicle (or the onboard device), the information about a tollgate, and entry time.

Subsequently, the roadside device 2 installed at an exit of the toll road establishes road-to-vehicle communication with the onboard device 1 to permit the billing server to identify a section of the toll road that has been traveled by the vehicle and to bill the driver of the vehicle on the basis of the traveled section and the time of passage. An example in which the roadside device 2 is installed at an entrance and exit of a toll road has been described. However, the roadside device 2 may also be installed at an entrance and exit of a pay parking lot and used to manage a parking lot fee. Further, the roadside device 2 may be installed, for example, at a gas station.

As illustrated in FIG. 1, the roadside device 2 includes a roadside device communication portion 21 and a roadside device controller 22. The roadside device communication portion 21 includes a transmission antenna and establishes road-to-vehicle communication with an onboard device 1 existing in the wireless communication area formed by the roadside device 2. More specifically, the roadside device communication portion 21 not only demodulates a signal received from the onboard device 1 and outputs the demodulated signal to the roadside device controller 22, but also modulates data inputted from the roadside device controller 22, converts the modulated data to an electric wave, and transmits the electric wave.

The roadside device controller 22 is formed of a computer that includes a known CPU, a nonvolatile memory such as a ROM, a flash memory, a volatile memory such as a RAM, a I/O device, and a bus line connecting the aforementioned components (all of these elements are not shown).

A roadside device memory 221 included in the roadside device controller 22 is a rewritable storage medium and implemented, for instance, by the flash memory or RAM included in the roadside device controller 22. The roadside device memory 221 stores program modules and data for performing various processes.

Figure 2:
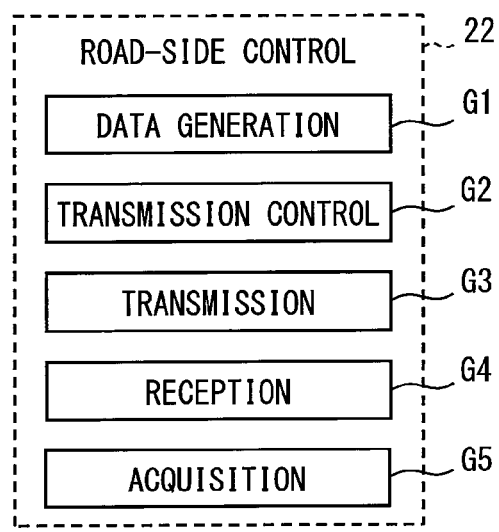
FIG. 2 is a block diagram illustrating an exemplary outline configuration of a roadside device controller.

As illustrated in FIG. 2, the roadside device controller 22 includes a roadside data generation portion G1, a roadside transmission control portion G2, a roadside transmission processing portion G3, a roadside reception processing portion G4, and a communication target acquisition portion G5 as functional blocks that are implemented by executing the program modules.

The roadside data generation portion G1 generates data to be transmitted to the onboard device 1 (the data is hereinafter referred to as the roadside-device-generated data). The roadside-device-generated data is, for example, data representative of driving assistance information, response request data for identifying an onboard device 1 existing in the wireless communication area of the roadside device 2, or data that requests a specific onboard device 1 to transmit billing information (the data is hereinafter referred to as the billing information request data).

The response request data is to be transmitted to all onboard devices 1 that exist in the wireless communication area of the roadside device 2. The response request data requests an onboard device 1, which has received the data, to transmit information (for example, the terminal ID) necessary for establishing P2P communication with the onboard device 1. The response request data may be generated, for instance, at predetermined transmission intervals (for example, at 100-millisecond intervals). Meanwhile, the billing information request data is transmitted to a specific onboard device 1 via P2P communication.

A timestamp is attached to the roadside-device-generated data in order to indicate the time at which the data was generated. The roadside-device-generated data generated by the roadside data generation portion G1 is stored in a transmission queue that is managed by the roadside transmission control portion G2. It is assumed that the transmission queue is a storage area for temporarily storing the roadside-device-generated data and is provided, for example, in the roadside device memory 221.

When the roadside-device-generated data is stored in the transmission queue, the roadside transmission control portion G2 causes the roadside reception processing portion G4 to detect the use of a carrier (that is, carrier sense) and determine whether the carrier is not used (that is, available). When it is determined that the carrier is available, the roadside transmission control portion G2 causes the roadside transmission processing portion G3 to transmit the oldest data stored in the transmission queue. Whether the carrier is available may be determined by using a known method. Here, as an example, the roadside-device-generated data stored in the transmission queue are sequentially transmitted beginning with the data generated at the earliest time. However, an alternative is to control the sequence of transmission on the basis, for example, of priority. The roadside transmission control portion G2 corresponds to a roadside device transmission control portion described in the present disclosure.

In compliance with an instruction from the roadside transmission control portion G2, the roadside transmission processing portion G3 outputs the roadside-device-generated data to the roadside device communication portion 21 for transmission purposes. The roadside reception processing portion G4 acquires the data received by the roadside device communication portion 21, that is, the road-to-vehicle communication data transmitted by the onboard device 1 (the data is hereinafter referred to as the road-to-vehicle data). As mentioned earlier, the road-to-vehicle data includes terminal IDs unique to individual onboard devices. Further, in compliance with an instruction from the roadside transmission control portion G2, the roadside reception processing portion G4 performs carrier sense on the basis of an input from the roadside device communication portion 21 and passes information indicative of the result of the carrier sense to the roadside transmission control portion G2. The roadside transmission processing portion G3 corresponds to a roadside device transmission processing portion described in the present disclosure.

The communication target acquisition portion G5 manages onboard devices 1 existing in its wireless communication area by using the terminal IDs included in the road-to-vehicle data received by the roadside reception processing portion G4.

(Configuration of Onboard Device 1)

A configuration of the onboard device 1 will be described. As illustrated in FIG. 1, the onboard device 1 includes an onboard device communication portion 11, a vehicle interface (hereinafter referred to as the vehicle IF) 12, and an onboard device controller 13. The onboard device communication portion 11 includes a transmission/reception antenna, demodulates a signal received from the roadside device 2 or from another onboard device 1, and outputs the demodulated signal to the onboard device controller 13. Further, the onboard device communication portion 11 modulates data inputted from the onboard device controller 13, converts the modulated data to an electric wave, and transmits the electric wave. The onboard device communication portion 11 also outputs, for instance, the reception level (for example, the field intensity) of a received signal to the onboard device controller 13. The reception level may be measured by using, for example, a known RSSI circuit.

The vehicle IF 12 is an interface that is used by the onboard device controller 13 to acquire vehicle status information indicative of a vehicle status, which is outputted from a vehicle-mounted ECU (Electronic Control Unit) and sensors. It is assumed that the vehicle IF 12 is connected to the vehicle-mounted ECU and sensors through an in-vehicle LAN compliant with a predetermined communication protocol.

The vehicle status information includes position information indicative of the current position of a host vehicle, a vehicle speed, the front-rear direction acceleration of the host vehicle, a yaw rate, a signal detected by a gearshift position sensor, the direction indicated by blinkers, the illumination status of hazard lamps, and a brake pedal depression amount. The position information is expressed, for instance, by latitude, longitude, and altitude (for example, the height from the sea level or other reference plane). The gearshift position sensor detects a gearshift position that varies with a gearshift lever manipulation by the driver.

When the onboard device 1 incorporates a known position detector (not shown) adapted to detect the current position of a host terminal and an acceleration sensor adapted to detect acceleration, data generated in the host terminal may be used instead of data acquired from the vehicle IF.

The onboard device controller 13 is formed of a computer that includes a known CPU, a nonvolatile memory such as a ROM, a flash memory, a volatile memory such as a RAM, a I/O device, and a bus line connecting the aforementioned components (all of these elements are not shown).

An internal memory 131 incorporated in the onboard device controller 13 is a rewritable storage medium and implemented, for instance, by the flash memory or RAM included in the onboard device controller 13.

The internal memory 131 stores program modules for performing various processes and threshold values and other data used for various determination processes. The internal memory 131 also stores, for example, the terminal ID set for the host vehicle. The internal memory 131 corresponds to an example of a threshold value storage portion described in the present disclosure.

Figure 3A:
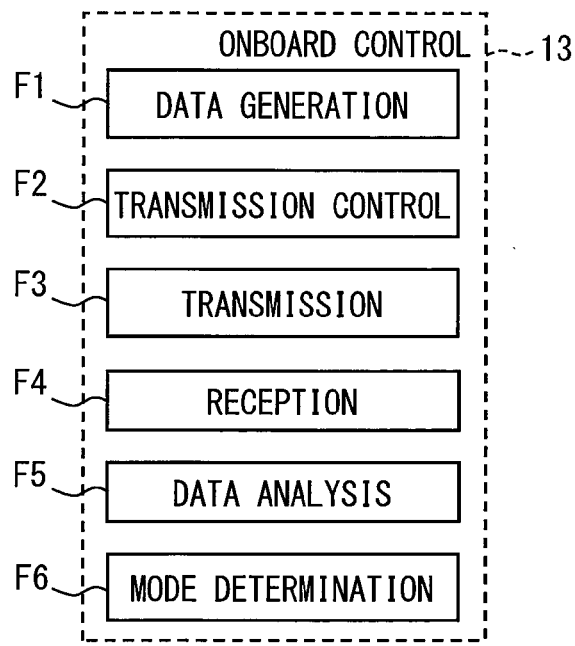
FIG. 3A is a block diagram illustrating an exemplary outline configuration of an onboard device controller.
Figure 3B:
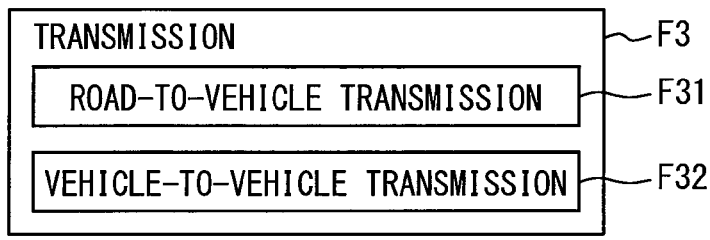
FIG. 3B is a block diagram illustrating an exemplary outline configuration of a transmission processing portion of the onboard device controller.
Figure 3C:
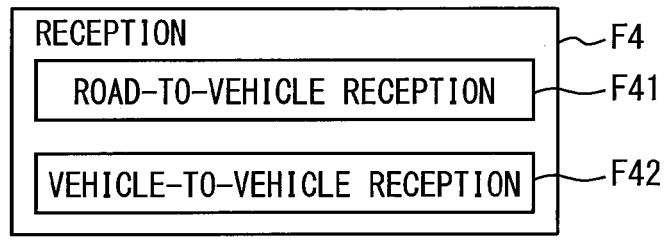
FIG. 3C is a block diagram illustrating an exemplary outline configuration of a reception processing portion of the onboard device controller.
Figure 3D:
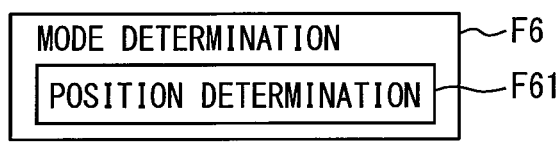
FIG. 3D is a block diagram illustrating an exemplary outline configuration of a mode determination portion of the onboard device controller.

Functions implemented when the onboard device controller 13 executes various program modules stored in the internal memory 131 will be described with reference to FIGS. 3A to 3D. As illustrated in FIG. 3A, the onboard device controller 13 includes various functional blocks, namely, a data generation portion F1, a transmission control portion F2, a transmission processing portion F3, a reception processing portion F4, a received-data analysis portion F5, and a mode determination portion F6.

Based on data acquired from the vehicle IF 12 and data stored in the internal memory 131, the data generation portion F1 generates data to be transmitted to another onboard device 1 and data to be transmitted to the roadside device 2. The data to be transmitted to the other onboard device 1 is the data transmitted via vehicle-to-vehicle communication and hereinafter referred to as the vehicle-to-vehicle data. The data to be transmitted to the roadside device 2 is the data transmitted via road-to-vehicle communication and referred to as the road-to-vehicle data as mentioned earlier.

The vehicle-to-vehicle data includes vehicle information about the host vehicle. The host vehicle is a vehicle in which the host terminal is mounted. Here, the vehicle information includes the terminal ID of a transmitting terminal, position information, a traveling direction, a vehicle speed, acceleration, a vehicle length, a travel path, and the direction indicated by blinkers. The vehicle-to-vehicle data may be generated in a data format employed by a vehicle-to-vehicle communication system. The vehicle-to-vehicle data is to be transmitted to all onboard devices 1 that receive the vehicle-to-vehicle data. The roadside device 2 may also receive and use the vehicle-to-vehicle data. The data generation portion F1 generates the vehicle-to-vehicle data at predetermined intervals (for example, at 100-millisecond intervals).

The road-to-vehicle data is, for example, a response to the response request data transmitted by the roadside device 2 or data for supplying billing information to the roadside device 2. Obviously, data including the vehicle information about the host vehicle may be transmitted as the road-to-vehicle data, as is the case with the vehicle-to-vehicle data.

In the present embodiment, each time the reception processing portion F4 receives roadside-device-generated data, the data generation portion F1 generates road-to-vehicle data related to the received roadside-device-generated data. However, the present disclosure is not limited to the use of such a scheme. An alternative is to pre-store various road-to-vehicle data in the internal memory 131 and read data appropriate for the roadside-device-generated data received from the roadside device 2.

Further, the road-to-vehicle data may be generated in a data format employed by a road-to-vehicle communication system. The road-to-vehicle data is to be transmitted to the roadside device 2. A transmission destination may be designated by a roadside device ID assigned to the roadside device 2.

A timestamp is attached to both the vehicle-to-vehicle data and road-to-vehicle data in order to indicate the time at which the data was generated, as is the case with the roadside-device-generated data. The vehicle-to-vehicle data generated by the data generation portion F1 is stored in a vehicle-to-vehicle transmission queue that is managed by the transmission control portion F2. The road-to-vehicle data generated by the data generation portion F1 is stored in a road-to-vehicle transmission queue that is managed by the transmission control portion F2. The vehicle-to-vehicle transmission queue and the road-to-vehicle transmission queue may be both provided, for example, in the internal memory 131. When new vehicle-to-vehicle data is to be added in a situation where previously generated vehicle-to-vehicle data is in the vehicle-to-vehicle transmission queue, the previously generated vehicle-to-vehicle data is deleted to add the new vehicle-to-vehicle data. That is to say, only the latest vehicle-to-vehicle data is stored in the vehicle-to-vehicle transmission queue.

The transmission control portion F2 has two different operation modes, namely, a regular transmission mode and a passive transmission mode. The transmission control portion F2 in the regular transmission mode establishes communication based on the known CSMA/CA method. More specifically, the transmission control portion F2 successively determines whether data waiting for transmission is stored in at least either the road-to-vehicle transmission queue or the vehicle-to-vehicle transmission queue. If any data waiting for transmission is queued, the transmission control portion F2 causes the reception processing portion F4 to perform carrier sense in order to determine whether the carrier is available.

When the carrier is determined to be available, the transmission control portion F2 instructs the transmission processing portion F3 to transmit data stored in each queue. That is, the transmission control portion F2 operating in the regular transmission mode sequentially transmits data stored in each queue depending on the usage of the carrier. Here, it is assumed as an example that the road-to-vehicle data is transmitted in preference to the vehicle-to-vehicle data, and that the road-to-vehicle data stored in the road-to-vehicle transmission queue are sequentially transmitted in order from the oldest to the newest.

Meanwhile, the transmission control portion F2 operating in the passive transmission mode stops the transmission of vehicle-to-vehicle data. Further, upon receipt of data addressed to the host terminal (including data addressed to all terminals) from the roadside device 2, the transmission control portion F2 operating in the passive transmission mode causes the transmission of the road-to-vehicle data related to the received data. That is, the transmission control portion F2 in the passive transmission mode does not cause the transmission of data unless it is necessary to transmit a response to the data received from the roadside device 2.

Conditions under which mode switching occurs between the regular transmission mode and the passive transmission mode will be explained when the mode determination portion F6 is described. The transmission control portion F2 changes its operation mode on the basis of the result of determination by the mode determination portion F6.

In compliance with an instruction from the transmission control portion F2, the transmission processing portion F3 performs a process of outputting various data to the onboard device communication portion 11 for transmission purposes. The transmission processing portion F3 is subdivided into functional blocks, namely, a road-to-vehicle transmission processing portion F31 and a vehicle-to-vehicle transmission processing portion F32.

In compliance with an instruction from the transmission control portion F2, the road-to-vehicle transmission processing portion F31 outputs the road-to-vehicle data stored in the road-to-vehicle transmission queue to the onboard device communication portion 11 for transmission purposes. In compliance with an instruction from the transmission control portion F2, the vehicle-to-vehicle transmission processing portion F32 outputs the vehicle-to-vehicle data stored in the vehicle-to-vehicle transmission queue to the onboard device communication portion 11 for transmission purposes.

The reception processing portion F4 performs a process of acquiring data received by the onboard device communication portion 11. After acquiring the data from the onboard device communication portion 11, the reception processing portion F4 passes the acquired data to the received-data analysis portion F5. Further, in compliance with an instruction from the transmission control portion F2, the reception processing portion F4 performs carrier sense on the basis of an input from the onboard device communication portion 11 and passes information indicative of the result of the carrier sense to the transmission control portion F2.

The received-data analysis portion F5 analyzes the contents (for example, a header portion) of the data received by the reception processing portion F4, and determines whether the received data is transmitted from the roadside device 2 (that is, the roadside-device-generated data) or is vehicle-to-vehicle data transmitted from another onboard device 1. When the received data is the vehicle-to-vehicle data, the received-data analysis portion F5 outputs the received data to a system that uses the vehicle-to-vehicle data through the vehicle IF 12.

When, by contrast, the received data is the roadside-device-generated data, the received-data analysis portion F5 determines whether the roadside-device-generated data is addressed to the host terminal (including a case where the data is addressed to all terminals). When the data is addressed to another onboard device 1 other than the host terminal, the received-data analysis portion F5 discards the data. When, by contrast, the data is addressed to the host terminal, the received-data analysis portion F5 further analyzes the contents of the data to determine whether it is necessary to generate road-to-vehicle data that serves as a response to the data addressed to the host terminal.

The road-to-vehicle data serving as a response to the data addressed to the host terminal needs to be generated when, for instance, the received data is response request data or data handled in a sequence of communication between the roadside device 2 and the onboard device 1. Whether the received data is data handled in a sequence of communication may be determined, for instance, by checking a sequence number assigned to each data set.

When road-to-vehicle data serving as a response to the data addressed to the host terminal needs to be generated, the data generation portion F1 is requested to generate road-to-vehicle data that corresponds to the roadside-device-generated data. When the received roadside-device-generated data is to be used by a system incorporated in the host vehicle, the data is outputted to the system through the vehicle IF 12.

The mode determination portion F6 determines whether the passive communication mode should be selected. This determination is made based on determination data that indicates whether the data transmission of the roadside device 2 may be obstructed by the host terminal's transmission of vehicle-to-vehicle communication data. In the present embodiment, the mode determination portion F6 includes a positional relationship determination portion F61 as a functional block. The mode determination portion F6 corresponds to a determination portion described in the present disclosure.

Based on positional relationship determination data, which determines the positional relationship between the host terminal and the roadside device 2, the positional relationship determination portion F61 determines whether the host terminal exists in a transmission inhibition area of the roadside device 2. The transmission inhibition area is formed around the roadside device 2 and is an area where the vehicle-to-vehicle communication data transmitted from the host terminal may obstruct the data transmission of the roadside device 2.

When, in the present embodiment, the positional relationship determination portion F61 determines that the host terminal exists in the transmission inhibition area, the mode determination portion F6 determines that the passive transmission mode should be selected. This causes the transmission control portion F2 to operate in the passive transmission mode. When, by contrast, the positional relationship determination portion F61 determines that the host terminal does not exist in the transmission inhibition area, the mode determination portion F6 determines that the passive transmission mode need not be selected. This causes the transmission control portion F2 to operate in the regular transmission mode. That is, the transmission inhibition area is an area that stops the vehicle-to-vehicle data transmission from onboard devices 1 existing in the transmission inhibition area and reduces the frequency of the use of the carrier in the vicinity of the roadside device 2.

In the present embodiment, it is assumed that the reception level of the roadside-device-generated data received by the onboard device communication portion 11 is used as the positional relationship determination data. An operation of the positional relationship determination portion F61 will be described below with reference to FIG. 4.

Figure 4:
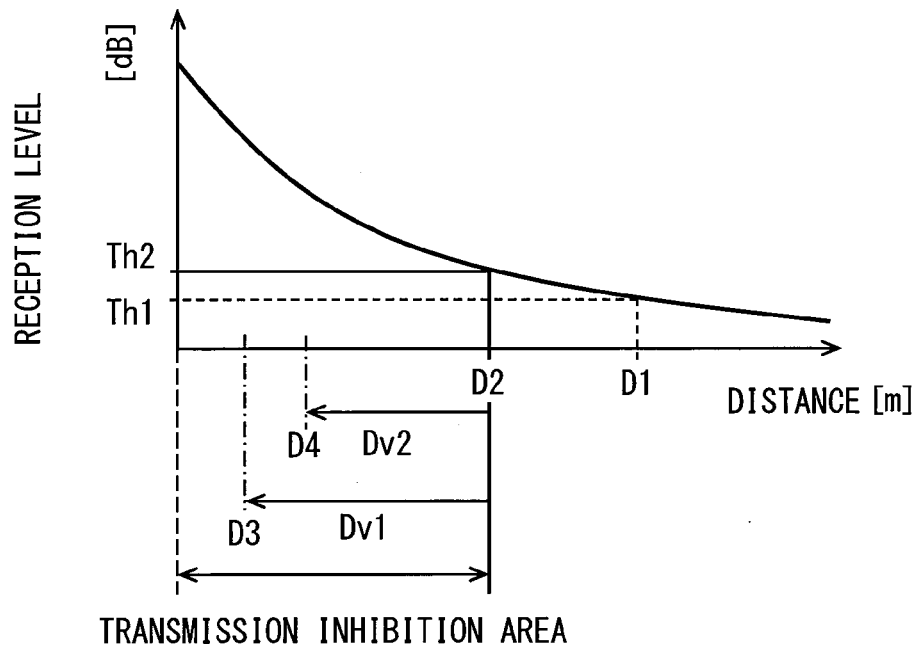
FIG. 4 is a diagram illustrating a positional relationship determination process based on the field intensity of a signal transmitted from a roadside device.

FIG. 4 is a conceptual diagram illustrating the relationship between the reception level of the roadside-device-generated data received by the onboard device communication portion 11 and the distance between the roadside device 2 and the onboard device 1. The horizontal axis of FIG. 4 represents the distance from the roadside device 2, and the origin of the horizontal axis represents a location at which the roadside device 2 is installed. The vertical axis of FIG. 4 represents the reception level of the roadside-device-generated data received by the onboard device communication portion 11.

In general, an electric wave transmitted from the roadside device 2 gradually attenuates as the distance from the roadside device 2 increases. As illustrated in FIG. 4, the reception level of the roadside-device-generated data received by the onboard device communication portion 11 also decreases with an increase in the distance from the roadside device 2.

The symbol Th1, which is marked along the vertical axis of FIG. 4, represents a decryption limit value, which is indicative of a limit at which a signal received by the onboard device communication portion 11 can be decrypted. More specifically, when the reception level of the received signal is equal to or greater than the decryption limit value Th1, the onboard device communication portion 11 can decrypt the received signal, and when the received signal is the roadside-device-generated data, the onboard device 1 can recognize that a signal from the roadside device 2 is received. The wireless communication area of a communication terminal is a range where a signal transmitted from the communication terminal travels at a signal level not lower than the decryption limit value Th1.

In the example of FIG. 4, a range where the distance from the roadside device 2 is equal to or shorter than D2 represents the wireless communication area of the roadside device 2. It can be recognized that the onboard device 1 receives data from the roadside device 2 when the onboard device 1 exists within this range. Here, as an example, the decryption limit value Th1 is assumed to be −90 dB although it depends on the performance of the onboard device communication portion 11.

Further, as illustrated in FIG. 4, the reception level of a signal received from the roadside device 2 gradually increases as the onboard device 1 approaches the roadside device 2. That is, the higher the reception level of the signal from the roadside device 2, the shorter the distance between the onboard device 1 and the roadside device 2.

In order to estimate the positional relationship to the roadside device 2 and determine whether the host terminal exists in the transmission inhibition area, the positional relationship determination portion F61 in the present embodiment utilizes the tendency of the reception level of the signal from the roadside device 2 to increase with a decrease in the distance between the onboard device 1 and the roadside device 2. More specifically, when the reception level is equal to or greater than a predetermined determination threshold value Th2, it is determined that the host terminal exists in the transmission inhibition area. In the example of FIG. 4, the transmission inhibition area is a range where the distance from the roadside device 2 is equal to or shorter than D2.

As mentioned earlier, the transmission inhibition area is an area that stops the vehicle-to-vehicle data transmission from onboard devices 1 existing in the transmission inhibition area and reduces the frequency of the use of the carrier in the vicinity of the roadside device 2. Therefore, the determination threshold value Th2 should be designed to sufficiently attenuate the vehicle-to-vehicle data transmitted from an onboard device 1 existing outside the transmission inhibition area and reduce the possibility of obstructing the data transmission of the roadside device 2 to a predetermined permissible level or lower.

The following description deals with an effect that is produced when, for example, the determination threshold value Th2 is designed based on the distance traveled by a signal transmitted from the onboard device 1 at a signal level at which the signal can be decrypted. The signal transmitted from the onboard device 1 gradually attenuates as the distance from the onboard device 1 increases, as is the case with the signal transmitted from the roadside device 2. When the distance traveled by the signal transmitted from the onboard device 1 at a decryptable signal level is Dv1, the signal transmitted from the onboard device 1 at a point representative of the boundary of the transmission inhibition area where the distance from the roadside device 2 is D2 reaches a point at a distance of D3 (=D2−Dv1) from the roadside device 2.

That is to say, the signal transmitted from the onboard device 1 no longer exists at a distance of D3 or shorter from the roadside device 2, and road-to-vehicle communication can be established as needed between the roadside device 2 and an onboard device 1 existing in an area at a distance of D3 or shorter from the roadside device 2. It is obvious in reality that vehicle-to-vehicle data traveling a distance of D3 or shorter than D3 from the roadside device 2 could exist depending on the influence of the surrounding environment. However, it is possible to reduce the frequency of the use of the carrier in the vicinity of the roadside device 2.

The above description deals with the effect that is produced when the determination threshold value Th2 is set based on the distance Dv1 traveled by a signal transmitted from the onboard device 1 at a decryptable signal level. However, the determination threshold value Th2 may be set based on a signal level that is used for carrier sense by a communication terminal. The reception level of a signal that causes each communication terminal to determine as a result of carrier sense that the carrier is being used (this reception level is referred to as the carrier sense level) is higher than the decryption limit value Th1 (for example, −60 dB or higher).

More specifically, a distance Dv2 that is traveled by the signal transmitted from the onboard device 1 at a level not lower than the carrier sense level is shorter than the distance Dv1 that is traveled at the decryptable signal level. The range covered by a vehicle-to-vehicle signal transmitted from the outside of the transmission inhibition area at a level not lower than the carrier sense level is an area at a distance of not shorter than D4 (=D2−Dv2) from the roadside device 2.

Consequently, communication terminals existing within a range that is at a distance of D4 or shorter than D4 from the roadside device 2 no longer determine that the carrier is being used by vehicle-to-vehicle data. Thus, road-to-vehicle communication can be established as needed between the roadside device 2 and an onboard device 1 existing in an area at a distance of D4 or shorter than D4 from the roadside device 2.

When the same determination threshold value Th2 is used, the distance D4 is longer than the distance D3 (D4>D3). More specifically, when the determination threshold value Th2 is set based on the distance Dv2 that is traveled by a signal at a level not lower than the carrier sense level, the determination threshold value Th2 can be set higher than when it is set based on the distance Dv1 that is traveled at a level not lower than the decryptable limit value Th1. This makes it possible to form a smaller transmission inhibition area.

An onboard device 1 existing in the transmission inhibition area is in the passive transmission mode, stops vehicle-to-vehicle communication, and does not transmit road-to-vehicle data until the roadside-device-generated data addressed to the onboard device 1 is received.

The distance D3 and the distance D4 represent the distance that is traveled at the decryptable signal level or carrier sense level by a signal transmitted from an onboard device 1 existing on the boundary line of the transmission inhibition area. That is to say, the distance D3 and the distance D4 represent the distance between the roadside device 2 and a point reached by a signal that is transmitted from an onboard device 1 existing outside the transmission inhibition area and delivered to a location closest to the roadside device 2. Vehicles traveling on a road are at a certain vehicle-to-vehicle-distance from each other. Further, each vehicle has its own vehicle length. Therefore, signals of all onboard devices 1 existing outside the transmission inhibition area are not delivered to a location where the distance from the roadside device 2 is D3 (or D4). Thus, as a vehicle moves from the boundary of the transmission inhibition area to its center (that is, the location where the roadside device 2 is installed), the amount of vehicle-to-vehicle data delivered at the decryptable signal level or carrier sense level decreases.

More specifically, as the possibility of the carrier being used for vehicle-to-vehicle communication decreases in the transmission inhibition area, it is possible to reduce the risk of road-to-vehicle communication being obstructed by vehicle-to-vehicle communication. Particularly, within a range where the distance from the roadside device 2 is equal to or shorter than D3 (or D4), the possibility of the carrier being used by a vehicle-to-vehicle data signal is extremely low. This makes it possible to provide communication quality (packet arrival rate and delay time) required for road-to-vehicle communication. An area where the communication quality for road-to-vehicle communication is provided, which is formed by designing the determination threshold value Th2 as appropriate, is referred to as the communication quality assurance area.

Here, it is assumed that the communication quality assurance area represents a range where vehicle-to-vehicle data transmitted from an onboard device 1 existing outside the transmission inhibition area is not supposed to reach the roadside device 2 at a predetermined level. However, the present disclosure is not limited to the use of such a communication quality assurance area. As far as road-to-vehicle communication is not obstructed, that is, the communication quality for road-to-vehicle communication is provided, the determination threshold value Th2 and the transmission inhibition area may be set so that the vehicle-to-vehicle data transmitted from an onboard device 1 existing outside the transmission inhibition area reaches the roadside device 2 at a predetermined level.

The determination threshold value Th2 can be stored in the internal memory 131. It is assumed as an example that the determination threshold value Th2 is −75 dB.

Figure 5:
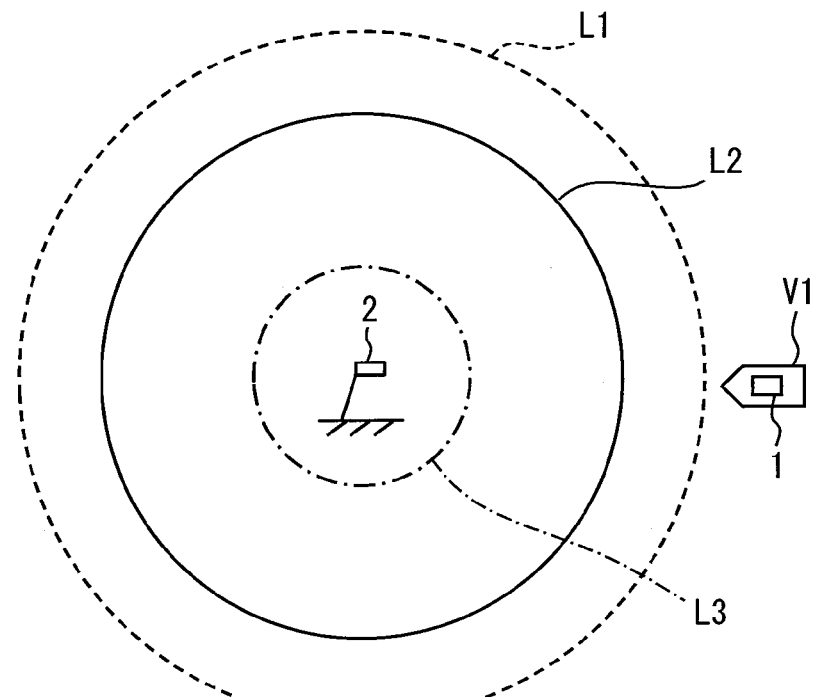
FIG. 5 is a diagram illustrating an operation according to the embodiment.

An operation of the present embodiment will be described with reference to FIG. 5. A broken line L1 in FIG. 5 represents the boundary line of the wireless communication area of the roadside device 2. An area enclosed by the broken line L1 represents the wireless communication area of the roadside device 2. More specifically, the broken line L1 indicates a range where a signal transmitted from the roadside device 2 is delivered at a decryptable signal level. When a vehicle V1 with the onboard device 1 enters the wireless communication area indicated by the broken line L1, the onboard device controller 13 receives the roadside-device-generated data transmitted from the roadside device 2 and recognizes the presence of the roadside device 2.

An area enclosed by a solid line L2 in FIG. 5 represents the transmission inhibition area of the roadside device 2. As mentioned earlier, the transmission inhibition area of the roadside device 2 is an area where the reception level of a signal transmitted from the roadside device 2 is equal to or greater than the determination threshold value Th2. In the transmission inhibition area, the onboard device 1 is in the passive transmission mode and stops vehicle-to-vehicle communication. Further, upon receipt of roadside-device-generated data addressed to the host terminal from the roadside device 2, the onboard device 1 in the passive transmission mode transmits road-to-vehicle data related to the received data.

The inside of a one-dot chain line L3 in FIG. 5 represents the communication quality assurance area that is formed when the onboard device 1 in the transmission inhibition area stops the transmission of vehicle-to-vehicle data. In an area enclosed by the one-dot chain line L3, only road-to-vehicle communication is established in most cases.

In the above-described configuration, the positional relationship determination portion F61 determines based on the positional relationship determination data whether an onboard device 1 exists in the transmission inhibition area of the roadside device 2. When it is determined that no onboard device 1 exists in the transmission inhibition area, the transmission control portion F2 operates in the regular transmission mode. When, by contrast, it is determined that an onboard device 1 exists in the transmission inhibition area, the passive transmission mode is selected to control the operation of the transmission processing portion F3.

When, in the passive transmission mode, data addressed to the host terminal is received from the roadside device 2 and it is necessary to respond to the received data, road-to-vehicle data related to the data received from the roadside device 2 is transmitted. That is, when the data addressed to the host terminal is not received from the roadside device 2, neither vehicle-to-vehicle communication data nor road-to-vehicle communication data is transmitted.

More specifically, when, in the transmission inhibition area, the roadside device 2 or the onboard device 1 needs to transmit road-to-vehicle communication data, the possibility of the carrier being used to transmit vehicle-to-vehicle communication data is reduced. That is to say, the possibility of the carrier frequency being used to convey vehicle-to-vehicle communication data is reduced. This reduces the possibility of the carrier frequency being used when a roadside device or a vehicle onboard communication terminal needs to transmit road-to-vehicle communication data.

Consequently, in a mobile communication system where vehicle-to-vehicle communication and road-to-vehicle communication are established by using the same carrier frequency and the CSMA method is employed as an access method, the above-described configuration makes it possible to reduce the risk of road-to-vehicle communication being obstructed by vehicle-to-vehicle communication.

Particularly, the possibility of the carrier being used by a vehicle-to-vehicle data signal in the communication quality assurance area is extremely lower than in the outside of the transmission inhibition area. Therefore, the communication quality (packet error rate, etc.) required for road-to-vehicle communication can be provided. Further, the road-to-vehicle communication is established in such a manner that each onboard device 1 responds to an inquiry from the roadside device 2. This makes it possible to reduce the risk of a hidden terminal causing a data conflict.

Further, the present embodiment is configured so that the reception level of a signal transmitted from the roadside device 2 is used as the positional relationship determination data. The reception level of the signal transmitted from the roadside device 2 varies with the environment surrounding the roadside device 2 and onboard device 1. Therefore, the transmission inhibition area is not a fixed range but a dynamically changing range. That is, when the reception level is employed as the positional relationship determination data, the transmission inhibition area can be formed based on a dynamically changing environment.

While the embodiment of the present disclosure has been described above, it should be understood that the present disclosure is not limited to the above-described embodiment. The following modified embodiments, which will be referred to as the modifications, are also included in the technical scope of the present disclosure. Further, in addition to the following modifications, various other modifications may be made without departing from the spirit of the present disclosure.

First Modification

The foregoing embodiment is configured so that the positional relationship determination portion F61 determines based on the reception level of a signal received from the roadside device 2 whether the host terminal exists in the transmission inhibition area. However, the present disclosure is not limited to such a configuration. In a first modification, the positional relationship determination portion F61 determines, based on the position information about the host vehicle (that is, the host terminal) and on the area information indicative of a range where the transmission inhibition area is set, whether the host terminal exists in the transmission inhibition area.

Figure 6:
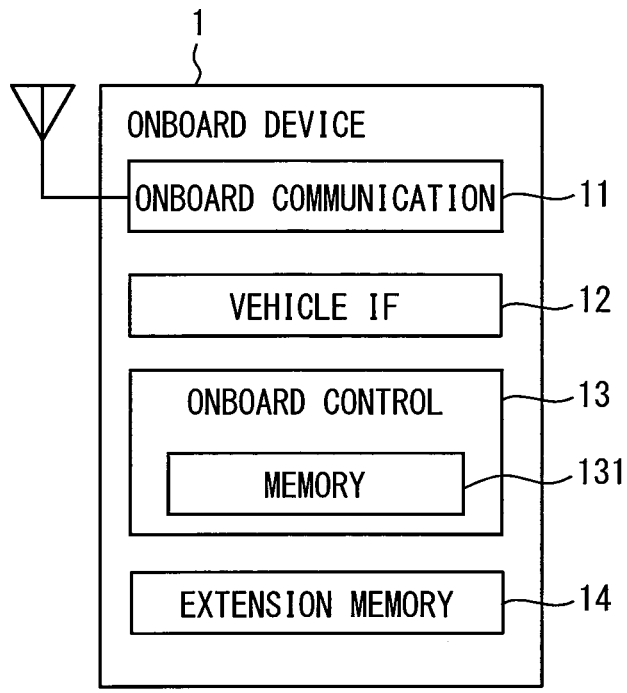
FIG. 6 is a block diagram illustrating an exemplary outline configuration of an onboard device according to a first modification.

Here, the transmission inhibition area is preset on the basis of a certain point (for example, the installation location of the roadside device 2). For example, the transmission inhibition area may be preset as an inhibition area radius that is a predetermined radius from the installation location of the roadside device 2. The inhibition area radius may be designed as appropriate. For example, the inhibition area radius may be set based on the distance that is traveled at the decryptable signal level (or at the carrier sense level) by a signal transmitted from the onboard device 1. The area information may indicate, for example, the boundary line of the transmission inhibition area by using the coordinates (latitude and longitude) of a plurality of points on the boundary line. The area information about each roadside device 2 may be stored in an extended memory 14 (see FIG. 6). The extended memory 14 corresponds to an example of an area information storage portion described in the present disclosure.

The extended memory 14 includes a rewritable nonvolatile storage medium and a device that reads data from and writes data onto the storage medium. A magnetic disk, an optical disk, a flash memory, or other known storage medium may be used as the storage medium included in the extended memory 14. The first modification is configured so that, for example, an SD card or other removable storage medium is used as the storage medium included in the extended memory 14. It is obvious that, for example, a DVD, a CD, or a HDD may also be used as the storage medium.

Here, as an example, the extended memory 14 stores the area information about each roadside device 2. However, the present disclosure is not limited to the use of such a configuration. When the internal memory 131 has a sufficient storage capacity for storing the area information about each roadside device 2, the area information may be stored in the internal memory 131. When the internal memory 131 and the extended memory 14 are not to be distinguished from each other, they are collectively referred to as the onboard device memory.

Figure 7:
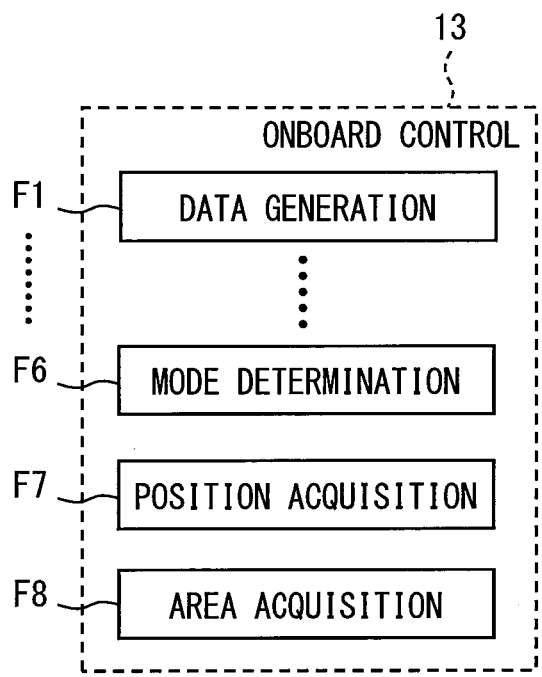
FIG. 7 is a block diagram illustrating an exemplary outline configuration of the onboard device controller according to the first modification.

In the first modification, the onboard device controller 13 includes a position information acquisition portion F7 and an area information acquisition portion F8, as illustrated in FIG. 7, in addition to the functional blocks described earlier in conjunction with the foregoing embodiment.

The position information acquisition portion F7 successively acquires the position information about the host vehicle (that is, the host terminal) through the vehicle IF 12 at intervals of, for example, 100 milliseconds. When the onboard device 1 incorporates a known position detector (not shown) that detects the current position of the host terminal, the position information detected by the position detector included in the host terminal may be used instead of the position information acquired through the vehicle IF 12.

Further, the position information acquisition portion F7 may detect the current position on the basis of data that is acquired, for instance, from a GPS receiver, a vehicle speed sensor, or a gyroscope mounted in the host vehicle through the vehicle IF 12.

The area information acquisition portion F8 acquires the area information from the extended memory 14. The area information acquired by the area information acquisition portion F8 may be determined from the position information about the host terminal, which is acquired by the position information acquisition portion F7, and the traveling direction of the host vehicle. Here, the area information acquisition portion F8 determines the area information about the roadside device 2, which describes the environment that the host terminal may encounter, on the basis of the position information and the traveling direction of the host vehicle, and then acquires the determined area information. Once the area information is acquired, it is stored, for example, in the internal memory 131 or in the RAM until it is determined to be unnecessary. The area information may be determined to be unnecessary when the position information and traveling direction indicate that the host terminal is leaving from a range covered by the area information.

The positional relationship determination portion F61 in the first modification determines, based on the position information acquired by the position information acquisition portion F7 and on the area information acquired by the area information acquisition portion F8, whether the host terminal exists in the transmission inhibition area indicated by the area information. The area information and the position information about the host terminal correspond to positional relationship determination data described in the present disclosure.

The above-described configuration produces the same effect as the foregoing embodiment. Further, the foregoing embodiment determines based on the reception level of a signal transmitted from the roadside device 2 whether the host terminal is in the transmission inhibition area. Therefore, the wireless communication area of the roadside device 2 needs to be wider than or equivalent to the wireless communication area of the onboard device 1.

However, it is conceivable that the wireless communication area of the roadside device 2 may be narrower than the wireless communication area of the onboard device 1. In such an instance, the roadside device 2 receives or carrier-senses a vehicle-to-vehicle communication signal transmitted from the onboard device 1 before the onboard device 1 recognizes its entry into the wireless communication area of the roadside device 2. Therefore, it is difficult to set the determination threshold value Th2 for the reception level in such a manner as to form an appropriate transmission inhibition area.

Meanwhile, the first modification is configured so that the transmission inhibition area is a fixed range determined based on the distance that is traveled at a predetermined level by a signal transmitted from the onboard device 1. Thus, the transmission inhibition area can be set as an appropriate range without regard to the wireless communication area of the roadside device 2. Consequently, the configuration of the first modification makes it possible to provide adequate road-to-vehicle communication quality in the vicinity of the roadside device 2 even when the wireless communication area of the roadside device 2 is narrower than the wireless communication area of the onboard device 1.

Second Modification

A second modification will be described. The first modification is configured so that the area information acquisition portion F8 supplies coordinate data indicative of the boundary line of the transmission inhibition area as the area information to the positional relationship determination portion F61. However, the present disclosure is not limited to such a configuration. More specifically, the area information is not limited to the coordinate data indicative of the boundary line of the transmission inhibition area. The area information may be information that enables the positional relationship determination portion F61 to determine whether the host terminal is in the transmission inhibition area. The information that determines whether the host terminal is in the transmission inhibition area is, for example, a combination of coordinates of the installation location of the roadside device 2 and inhibition area setup data that defines the range of the transmission inhibition area.

The inhibition area setup data is, for example, the aforementioned inhibition area radius. The inhibition area radius is a fixed value with respect to all roadside devices 2. Alternatively, however, the inhibition area radius may be a value that varies from one roadside device 2 to another. The data indicative of the installation location of each roadside device 2 and the inhibition area setup data may be stored in the internal memory 131 or other onboard device memory.

After determining, based on the position information about the host terminal and the installation location of each roadside device 2, the roadside device 2 that the host terminal may encounter, the area information acquisition portion F8 supplies the installation location of the roadside device 2 and area information setup data to the positional relationship determination portion F61.

Based on the position information about the host terminal, the installation location of the roadside device 2, which is inputted from the area information acquisition portion F8, and the inhibition area radius, the positional relationship determination portion F61 determines whether the host terminal exists in the transmission inhibition area. Specifically, when the distance between the host terminal and the roadside device 2 is less than the inhibition area radius, the positional relationship determination portion F61 determines that the host terminal exists in the transmission inhibition area. In the second modification, which has been described above, the inhibition area radius corresponds to a threshold value that is used to determine whether or not to select the passive transmission mode described in the present disclosure.

The above-described configuration produces the same effect as the first modification. Further, the data to be stored in the onboard device memory as the area information is limited to the coordinate data indicative of the installation location of the roadside device 2 and the inhibition area radius. Therefore, the storage capacity required for the onboard device memory can be smaller than when each roadside device 2 stores a plurality of coordinate data indicative of the boundary line of the transmission inhibition area.

Third Modification

Figure 8:
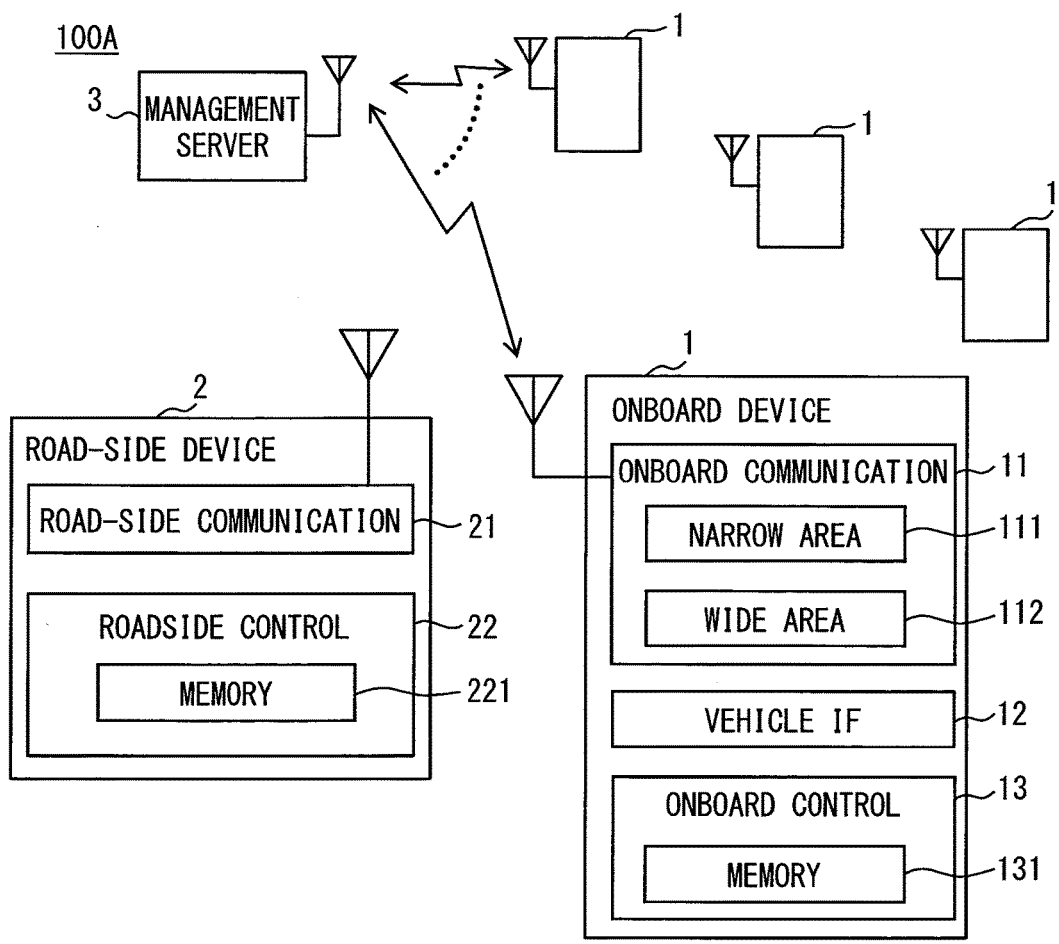
FIG. 8 is a block diagram illustrating an exemplary outline configuration of a mobile communication system according to a third modification.

The first and second modifications are configured so that the area information is stored in the extended memory 14, the internal memory 131, or other onboard device memory. However, the present disclosure is not limited to such a configuration. As illustrated in FIG. 8, a mobile communication system 100A according to a third modification includes a management server 3 that communicates with the onboard device 1. The area information acquisition portion F8 may acquire the area information from the management server 3, which is installed outside of the vehicle. The management server 3 stores the area information about each roadside device 2, which has been described in conjunction with the first and second modifications, and distributes the area information requested from the onboard device 1. A configuration of the third modification will be described below.

As illustrated in FIG. 8, the onboard device communication portion 11 of the onboard device 1 in the third modification includes a narrow area communication portion 111 and a wide area communication portion 112. The narrow area communication portion 111 corresponds to the onboard device communication portion described in conjunction with the foregoing embodiment and the first and second modifications, and establishes vehicle-to-vehicle communication and road-to-vehicle communication.

The wide area communication portion 112 has a communication range of several kilometers and can establish communication with another communication device connected to a public communication network by communicating with its base station. It is assumed that the wide area communication portion 112 is implemented by a communication module used, for instance, in a third- or fourth-generation mobile communication system. The wide area communication portion 112 permits the onboard device 1 to exchange data with the management server 3. The onboard device 1 successively transmits the position information about the host terminal (at intervals of, for example, 200 milliseconds) to the management server 3. The management server 3 returns the area information about a roadside device 2 that the onboard device may encounter.

The area information acquisition portion F8 acquires the area information received by the wide area communication portion 112 and supplies the acquired area information to the positional relationship determination portion F61. The configuration described above also produces the same effect as the first modification.

The third modification is configured so that the area information acquisition portion F8 directly acquires the area information from the management server 3 via the wide area communication between the management server 3 and the wide area communication portion 112. However, the present disclosure is not limited to such a configuration. The management server 3 may distribute the area information to onboard devices 1 through the roadside device 2. More specifically, the area information acquisition portion F8 may acquire the area information via the road-to-vehicle communication between the narrow area communication portion 111 and the roadside device 2 managed by the management server 3.

Fourth Modification

The foregoing embodiment and the first to third modifications, which have been described above, are configured so that the onboard device controller 13 switches from one transmission mode to another on the basis of the positional relationship between the host terminal and the roadside device 2. However, the present disclosure is not limited to such a configuration.

Figure 9A:
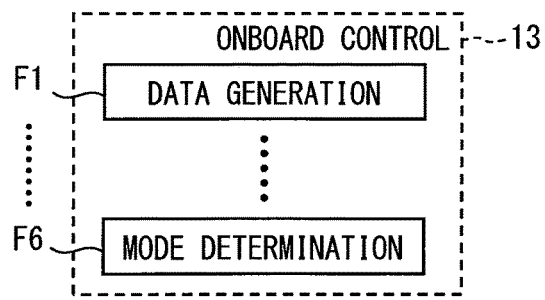
FIG. 9A is a block diagram illustrating an exemplary outline configuration of the onboard device controller according to a fourth modification or a fifth modification.
Figure 9B:
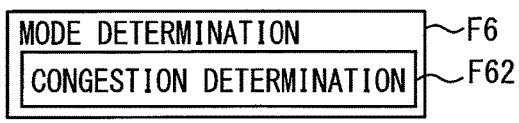
FIG. 9B is a block diagram illustrating an exemplary outline configuration of a mode determination portion of the onboard device controller.

As illustrated in FIGS. 9A and 9B, the mode determination portion F6 in a fourth modification includes a congestion determination portion F62 in place of the positional relationship determination portion F61. Based on the result of determination by the congestion determination portion F62, the mode determination portion F6 determines whether or not to select the passive communication mode. A configuration of the fourth modification will be described below.

Based on congestion index data indicative of the degree of congestion, that is, the frequency of the use of the carrier in the vicinity of the roadside device 2, the congestion determination portion F62 determines whether data transmission from the roadside device 2 is obstructed by vehicle-to-vehicle communication. The degree of congestion may be regarded as the ratio of time during which the carrier is being used in the vicinity of the roadside device 2 to a predetermined length of time. The congestion determination portion F62 corresponds to a carrier usage determination portion described in the present disclosure.

More specifically, the congestion determination portion F62 determines, based on the elapsed time from the instant at which periodic transmission data transmitted at predetermined intervals was last received from the roadside device 2, whether the data transmission from the roadside device 2 is obstructed by vehicle-to-vehicle communication. The elapsed time from the instant at which the periodic transmission data transmitted at predetermined intervals was last received from the roadside device 2 corresponds to the aforementioned congestion index data. The periodic transmission data is, for example, response request data.

The following describes the reason why the elapsed time from the instant at which the periodic transmission data transmitted at predetermined intervals was last received from the roadside device 2 can be used as the congestion index data. First of all, when, for instance, a small number of onboard devices 1 exist in the vicinity of the roadside device 2, a small number of communication terminals attempt to transmit data. Thus, the degree of congestion is low. When the degree of congestion is low, the roadside device 2 performs carrier sense and is likely to determine that the carrier is available. Therefore, there is a short time lag between the instant at which the periodic transmission data is generated and the instant at which the generated transmission data is transmitted. Thus, there is a small difference between the transmission intervals and the intervals at which the periodic transmission data is actually transmitted. Therefore, there is also a small difference between the transmission intervals and the intervals at which the onboard device 1 receives the periodic transmission data.

Meanwhile, when, for instance, a large number of onboard devices 1 exist in the vicinity of the roadside device 2 so that the degree of congestion is high, the roadside device 2 performs carrier sense and is likely to determine that the carrier is unavailable. Further, even when the carrier sense is performed after waiting for a predetermined period of time, the carrier may be used in some cases for the transmission of vehicle-to-vehicle data. In such an instance, there is a long time lag between the instant at which the periodic transmission data is generated by the roadside data generation portion G1 and the instant at which the transmission is started after determining that the carrier is available.

That is, when the degree of congestion is high, the time lag between the generation of the periodic transmission data and its transmission is longer than when the degree of congestion is low, and there is a great difference between the transmission intervals and the intervals at which the periodic transmission data is actually transmitted. This increases the difference between the transmission intervals and the intervals at which the onboard device 1 receives the periodic transmission data. It signifies that the degree of congestion is high when the next periodic transmission data is not received even when the elapsed time from the instant at which the periodic transmission data was last received from the roadside device 2 exceeds the length of time that is obtained by adding a predetermined standby time to the value of transmission intervals. The standby time may be a permissible time that permits several occurrences of standby as a result of carrier sense. The length of time that is obtained by adding the standby time to the value of transmission intervals is referred to as the periodic determination time.

In view of the above, when the periodic determination time is exceeded by the elapsed time from the last reception of the periodic transmission data, the congestion determination portion F62 determines that the data transmission of the roadside device 2 is obstructed by vehicle-to-vehicle communication. Based on the above determination made by the congestion determination portion F62, the mode determination portion F6 determines that the transmission control portion F2 should be placed in the passive transmission mode.

In response to the above determination made by the mode determination portion F6, the transmission control portion F2 operates in the passive transmission mode. The length of time during which the passive transmission mode is maintained may be, for example, a fixed period of time that is sufficiently longer than the periodic determination time. An alternative is to maintain the passive transmission mode until the host terminal leaves the wireless communication area of the roadside device 2. The periodic determination time, the length of time during which the passive transmission mode is maintained, and other relevant settings may be stored in the internal memory 131.

If, by contrast, the periodic determination time is exceeded by the elapsed time from the last reception of the periodic transmission data, it is determined that the data transmission of the roadside device is not obstructed by vehicle-to-vehicle communication. In this instance, the elapsed time from the last reception of the periodic transmission data is reset to 0 (zero) to resume a measurement process. This process, too, may be performed when the congestion determination portion F62 determines that the host terminal exists in the wireless communication area of the same roadside device 2.

Whether the host terminal exists in the wireless communication area of the same roadside device 2 may be determined based on the distance between the installation location of the roadside device 2 and a location indicated by the position information about the host terminal. Further, when the data from the roadside device 2 is no longer received in the passive transmission mode, it may be determined that the host terminal has left the wireless communication area of the roadside device 2.

When the congestion determination portion F62 determines that the data transmission by the roadside device 2 is obstructed by vehicle-to-vehicle communication, the above-described configuration causes the onboard device 1 to enter the passive transmission mode, stop the vehicle-to-vehicle communication, and establish road-to-vehicle communication only. As the onboard device 1 stops the vehicle-to-vehicle communication, the degree of congestion becomes lower, thereby facilitating the data transmission of the roadside device 2. Consequently, road-to-vehicle communication is unlikely to be obstructed by vehicle-to-vehicle communication in a mobile communication system where vehicle-to-vehicle communication and road-to-vehicle communication are established by using the same carrier frequency and each communication terminal uses the CSMA method for data transmission.

Further, when the degree of congestion is low and the congestion determination portion F62 does not determine that the data transmission by the roadside device 2 is obstructed by vehicle-to-vehicle communication, the configuration of the fourth modification makes it possible to establish vehicle-to-vehicle communication even in the vicinity of the roadside device 2.

Fifth Modification

The fourth modification, which has been described above, is configured so as to determine, based on the elapsed time from the last reception of the periodic transmission data that is transmitted at predetermined intervals from the roadside device 2, whether the data transmission by the roadside device 2 is obstructed by vehicle-to-vehicle communication. However, the present disclosure is not limited to such a configuration.

The congestion determination portion F62 may determine, based on the difference between the time (reception time) at which the road-side-device generated data was received by the reception processing portion F4 and a generation time included in the received data, whether the data transmission of the roadside device 2 is obstructed by vehicle-to-vehicle communication. That is, the difference between the reception time of the road-side-device generated data and the generation time of the data may be used as the congestion index data.

The reason is that, as mentioned in conjunction with the fourth modification, when the degree of congestion is low, there is a short time lag between the instant at which the roadside-device-generated data is generated by the roadside data generation portion G1 of the roadside device 2 and the instant at which the generated data is transmitted by the roadside transmission processing portion G3. That is, when the degree of congestion is relatively low, there is also a relatively small difference between the reception time of the roadside-device-generated data received by the reception processing portion F4 of the onboard device 1 and the generation time of the received data.

If, by contrast, the degree of congestion is high, there is a long time lag between the instant at which the roadside-device-generated data is generated by the roadside data generation portion G1 and the instant at which the generated data is transmitted by the roadside transmission processing portion G3. Thus, when the degree of congestion is high, there is also a relatively large difference between the reception time of the roadside-device-generated data received by the reception processing portion F4 of the onboard device 1 and the generation time of the received data.

In view of the above, when the difference between the reception time of the roadside-device-generated data and the generation time of the data is equal to or greater than a predetermined permissible time lag, the congestion determination portion F62 in the fifth modification determines that the degree of congestion is high and that the data transmission by the roadside device 2 is obstructed by vehicle-to-vehicle communication. If, by contrast, the difference between the reception time of the roadside-device-generated data and the generation time of the data is smaller than the permissible time lag, the congestion determination portion F62 determines that the degree of congestion is low and that the data transmission by the roadside device 2 is not obstructed by vehicle-to-vehicle communication. The permissible time lag may be designed as appropriate based on the communication quality required for road-to-vehicle communication. The permissible time lag may be stored in the internal memory 131.

Operations performed by the mode determination portion F6 and the transmission control portion F2 when the congestion determination portion F62 determines that the data transmission by the roadside device 2 is obstructed by vehicle-to-vehicle communication may be the same as described in conjunction with the fifth modification. The above-described configuration also produces the same effect as the fifth modification. Further, the configuration of the fifth modification makes it possible to determine upon receipt of the roadside-device-generated data whether the data transmission by the roadside device 2 is obstructed by vehicle-to-vehicle communication.

Sixth Modification

The foregoing embodiment and the first to fifth modifications, which have been described above, are configured so that the mode determination portion F6 includes either the positional relationship determination portion F61 or the congestion determination portion F62. Alternatively, however, the mode determination portion F6 may include both the positional relationship determination portion F61 and the congestion determination portion F62.

When the positional relationship determination portion F61 determines that the host terminal exists in the transmission inhibition area and the congestion determination portion F62 determines that the data transmission by the roadside device 2 is obstructed by vehicle-to-vehicle communication, the mode determination portion F6 in a sixth modification having the above-mentioned configuration may determine that the passive transmission mode should be selected. Even when the host terminal exists in the transmission inhibition area, the configuration described above makes it possible to establish vehicle-to-vehicle communication when the degree of congestion is determined to be relatively low.

Seventh Modification

According to the above-described configuration, the mode determination portion F6 uses a predetermined threshold value stored in the internal memory 131 or other onboard device memory to determine whether the passive transmission mode should be selected as the transmission mode. However, the present disclosure is not limited to such a configuration. The onboard device 1, which has a function of communicating with the management server 3 as illustrated in FIG. 8, may acquire an appropriate threshold value depending on the situation (a distribution threshold value) from the management server 3 and let the mode determination portion F6 use the acquired threshold value for determination purposes. The above-mentioned threshold value is the determination threshold value Th2 described in conjunction with the foregoing embodiment, the inhibition area radius, the periodic determination time, or the permissible time lag.

More specifically, the management server 3 generates the distribution threshold value as needed and transmits the generated distribution threshold value to the onboard device 1. If, for instance, the mobile communication system 100A has a configuration according to the fifth modification, the management server 3 distributes a permissible time lag that is different from the permissible time lag stored in the internal memory 131. When the onboard device 1 receives the distribution threshold value from the management server 3, the mode determination portion F6 uses the distribution threshold value received from the management server 3 to determine whether the passive transmission mode should be selected as the transmission mode.

The above-described configuration permits the management server 3 to change as needed the conditions under which the mode determination portion F6 included in the onboard device 1 determines that the passive transmission mode should be selected.

According to the configuration of a seventh modification, which has been described above, the onboard device 1 receives the distribution threshold value from the management server 3 via wide area communication between the wide area communication portion 112 and the management server 3. However, the present disclosure is not limited to such a configuration. Alternatively, the management server 3 may distribute the distribution threshold value to the onboard device 1 through the roadside device 2. That is, the onboard device 1 may receive the distribution threshold value via road-to-vehicle communication between the narrow area communication portion 111 and the roadside device 2 managed by the management server 3. The distribution threshold value distributed from the roadside device 2 may be used to determine the transmission mode relative to the roadside device 2 or determine the transmission mode relative to the next roadside device 2 to be encountered.

While various embodiments, configurations, and aspects of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects according to the present disclosure.

What is claimed is:

1. A vehicle onboard communication terminal in a mobile communication system that establishes vehicle-to-vehicle communication and road-to-vehicle communication by using a carrier wave having an identical carrier frequency and employs Carrier Sense Multiple Access/Collision Avoidance method as an access method, the vehicle onboard communication terminal comprising:
   a reception processing portion that receives road-to-vehicle communication data transmitted from a roadside device and vehicle-to-vehicle communication data transmitted from a different vehicle onboard communication terminal;
   a transmission processing portion that performs a process transmitting the road-to-vehicle communication data and the vehicle-to-vehicle communication data;
   a transmission control portion that controls an operation of the transmission processing portion and has a regular transmission mode and a passive transmission mode as a mode of controlling the operation of the transmission processing portion; and
   a determination portion that determines, based on determination data, whether to place the transmission control portion in the passive transmission mode, the determination data determining whether a transmission of the vehicle-to-vehicle communication data from the vehicle onboard communication terminal is likely to obstruct transmission of the road-to-vehicle communication data from the roadside device or from the different vehicle onboard communication terminal,
   wherein:
   the transmission control portion operates in the passive transmission mode when the determination portion has determined that the transmission control portion is to be placed in the passive transmission mode, and operates in the regular transmission mode when the determination portion has not determined that the transmission control portion is to be placed in the passive transmission mode;
   the transmission control portion detects usage of the carrier frequency when the transmission control portion is operating in the regular transmission mode, and operates so as to successively transmit the road-to-vehicle communication data and the vehicle-to-vehicle communication data when the carrier frequency is determined to be unused; and
   the transmission control portion stops the transmission of the vehicle-to-vehicle communication data and receives data addressed to the vehicle onboard communication terminal from the roadside device when the transmission control portion is operating in the passive transmission mode, and operates so as to transmit the road-to-vehicle communication data when a response needs to be transmitted in response to a received data.

2. The vehicle onboard communication terminal according to claim 1, wherein:
   the determination portion includes a positional relationship determination portion that determines, based on positional relationship determination data defining a positional relationship between the vehicle onboard communication terminal and the roadside device, whether the vehicle onboard communication terminal exists in a predetermined transmission inhibition area that is an area where the vehicle-to-vehicle communication data transmitted from the vehicle onboard communication terminal is likely to obstruct the transmission of the road-to-vehicle communication data from the roadside device or from the different vehicle onboard communication terminal; and when the positional relationship determination portion has determined that the vehicle onboard communication terminal exists in the transmission inhibition area of the roadside device, the determination portion determines that the transmission control portion is to be placed in the passive transmission mode.

3. The vehicle onboard communication terminal according to claim 2, wherein:

the positional relationship determination data is a reception level of a signal received from the roadside device; and when the reception level is equal to or greater than a predetermined determination threshold value, the positional relationship determination portion determines that the vehicle onboard communication terminal exists in the transmission inhibition area of the roadside device.

4. The vehicle onboard communication terminal according to claim 2, further comprising:

a position information acquisition portion that acquires position information about the vehicle onboard communication terminal; and an area information acquisition portion that acquires area information indicative of a range where the transmission inhibition area of the roadside device is formed, wherein:

the positional relationship determination portion determines, based on the position information acquired by the position information acquisition portion and on the area information acquired by the area information acquisition portion, whether the vehicle onboard communication terminal exists in the transmission inhibition area of the roadside device.

5. The vehicle onboard communication terminal according to claim 4, further comprising:

an area information storage portion that stores the area information, wherein:

the area information acquisition portion acquires the area information from the area information storage portion.

6. The vehicle onboard communication terminal according to claim 1, wherein:

the determination portion includes a carrier usage determination portion that determines, based on congestion index data indicating a degree of congestion of communication with the carrier wave in a wireless communication area of the roadside device, whether data transmission by the roadside device is obstructed by the vehicle-to-vehicle communication; and when the carrier usage determination portion has determined that the data transmission by the roadside device is obstructed by the vehicle-to-vehicle communication, the determination portion determines that the transmission control portion is to be placed in the passive transmission mode.

7. The vehicle onboard communication terminal according to claim 6, wherein:

the congestion index data is an elapsed time from a last reception of periodic transmission data, the periodic transmission data being transmitted at predetermined transmission intervals from the roadside device; and when the elapsed time is longer than the transmission intervals by a length of time not shorter than a predetermined value, the carrier usage determination portion determines that the data transmission by the roadside device is obstructed by the vehicle-to-vehicle communication.

8. The vehicle onboard communication terminal according to claim 6, wherein:

the road-to-vehicle communication data transmitted from the roadside device includes information about a generation time at which the data has been generated;

the congestion index data is a difference between a reception time at which data transmitted from the roadside device has been received by the reception processing portion and the generation time included in the data; and when the difference between the reception time and the generation time is equal to or greater than a predetermined permissible time lag, the carrier usage determination portion determines that the data transmission by the roadside device is obstructed by the vehicle-to-vehicle communication.

9. The vehicle onboard communication terminal according to claim 4, further comprising:

a communication portion that communicates with a management server that is disposed outside a vehicle to store the area information, wherein:

the area information acquisition portion acquires the area information from the management server through the communication portion.

10. The vehicle onboard communication terminal according to claim 1, further comprising:

a threshold value storage portion that stores a threshold value used by the determination portion to determine whether to place the transmission control portion in the passive transmission mode; and a communication portion that is placed outside the vehicle and communicates with a management server managing a distribution threshold value different from the threshold value stored in the threshold value storage portion, wherein:

the communication portion receives the distribution threshold value from the management server; and when the communication portion receives the distribution threshold value from the management server, the determination portion determines whether to place the transmission control portion in the passive transmission mode by using the distribution threshold value received by the communication portion in preference to the threshold value stored in the threshold value storage portion.

11. The vehicle onboard communication terminal according to claim 1, wherein:

the determination portion includes a positional relationship determination portion that determines, based on positional relationship determination data defining a positional relationship, whether the vehicle onboard communication terminal exists in a predetermined transmission inhibition area that is an area where the vehicle-to-vehicle communication data transmitted from the vehicle onboard communication terminal is likely to obstruct the transmission of the road-to-vehicle communication data from the roadside device or from the different vehicle onboard communication terminal.

12. A mobile communication system that establishes vehicle-to-vehicle communication and road-to-vehicle communication by using a carrier wave having an identical carrier frequency and employs Carrier Sense Multiple Access/Collision Avoidance method as an access method, the mobile communication system comprising:
- a plurality of vehicle onboard communication terminals; and
- a roadside device, wherein:
the roadside device includes
- a roadside device transmission processing portion that performs a process of transmitting road-to-vehicle communication data, and
- a roadside device transmission control portion that detects usage of the carrier frequency, and when the carrier frequency is determined to be unused, operates so as to transmit the road-to-vehicle communication data;

each of the vehicle onboard communication terminals includes
- a reception processing portion that receives the road-to-vehicle communication data transmitted from the roadside device and vehicle-to-vehicle communication data transmitted from a different vehicle onboard communication terminal,
- a transmission processing portion that performs a process transmitting the road-to-vehicle communication data and the vehicle-to-vehicle communication data,
- a transmission control portion that controls an operation of the transmission processing portion and has a regular transmission mode and a passive transmission mode as a mode of controlling the operation of the transmission processing portion, and
- a determination portion that determines based on determination data whether to place the transmission control portion in the passive transmission mode, the determination data determining whether a transmission of the vehicle-to-vehicle communication data from the vehicle onboard communication terminal is likely to obstruct the transmission of the road-to-vehicle communication data from the roadside device or from the different vehicle onboard communication terminal;

the transmission control portion operates in the passive transmission mode when the determination portion has determined that the transmission control portion is to be placed in the passive transmission mode, and operates in the regular transmission mode when the determination portion has not determined that the transmission control portion is to be placed in the passive transmission mode;

the transmission control portion detects the usage of the carrier frequency when the transmission control portion is operating in the regular transmission mode, and operates so as to successively transmit the road-to-vehicle communication data and the vehicle-to-vehicle communication data when the carrier frequency is determined to be unused; and the transmission control portion stops the transmission of the vehicle-to-vehicle communication data and receives data addressed to the vehicle onboard communication terminal from the roadside device when the transmission control portion is operating in the passive transmission mode, and operates so as to transmit the road-to-vehicle communication data when a response needs to be transmitted in response to the received data.

13. The vehicle onboard communication terminal according to claim 12, wherein:
the determination portion includes a positional relationship determination portion that determines, based on positional relationship determination data defining a positional relationship, whether the vehicle onboard communication terminal exists in a predetermined transmission inhibition area that is an area where the vehicle-to-vehicle communication data transmitted from the vehicle onboard communication terminal is likely to obstruct the transmission of the road-to-vehicle communication data from the roadside device or from the different vehicle onboard communication terminal.

14. The vehicle onboard communication terminal according to claim 12, wherein:
the determination portion includes a positional relationship determination portion that determines, based on positional relationship determination data defining a positional relationship between the vehicle onboard communication terminal and the roadside device, whether the vehicle onboard communication terminal exists in a predetermined transmission inhibition area that is an area where the vehicle-to-vehicle communication data transmitted from the vehicle onboard communication terminal is likely to obstruct the transmission of the road-to-vehicle communication data from the roadside device or from the different vehicle onboard communication terminal; and when the positional relationship determination portion has determined that the vehicle onboard communication terminal exists in the transmission inhibition area of the roadside device, the determination portion determines that the transmission control portion is to be placed in the passive transmission mode.

* * * * *